RADIO COURSE LINE BEACON RADIATING A CLEARANCE SIGNAL

Filed March 24, 1964 4 Sheets-Sheet 1

Inventor
CHARLES W. EARP
By [signature]
Attorney

Inventor
CHARLES W. EARP
By Isidore Togut
Attorney

RADIO COURSE LINE BEACON RADIATING A CLEARANCE SIGNAL

Filed March 24, 1964 4 Sheets-Sheet 3

Inventor
CHARLES W. EARP
By [signature]
Attorney

Inventor
CHARLES W. EARP
By Isidore Togut
Attorney

United States Patent Office 3,305,866

Patented Feb. 21, 1967

3,305,866

RADIO COURSE LINE BEACON RADIATING A CLEARANCE SIGNAL

Charles William Earp, London, England, assignor to International Standard Electric Corporation, New York, N.Y., a corporation of Delaware Filed Mar. 24, 1964, Ser. No. 354,294
Claims priority, application Great Britain, Apr. 26, 1963, 16,555/63
9 Claims. (Cl. 343—109)

This invention relates to beacons for electromagnetically defining a course line for craft to follow.

The invention is particularly, though not exclusively, applicable to defining glide-path course lines in the vicinity of airports.

Definition of the course line is in most present day systems by highly directive radiation lobes which partially overlap. The craft manouvers in the overlapping region to where equal signals are received from the two lobes, and then chooses the course line on which this condition is maintained. The lobes are usually amplitude modulated at two low frequencies (i.e. 150 and 90 c./s.) which have opposite phases on each lobe for their identification by the craft. Deviation from the course line causes one or the other received AM to predominate, taking the sense of the modulation into consideration.

If the parts of the lobes not on the defined course lines are scattered or reflected from obstacles, the course line may be difficult to follow due to additional reception of spurious signals. Thus the lobes are best highly directive.

This high directivity results in no information being available to the craft unless it is near the course line.

To overcome this, it has already been proposed to radiate a secondary pattern of signal lobes, in effect from a separate beacon of low directivity, which, being of low directivity, can radiate information bearing sidebands over a wide angle, or perhaps over the complete range of azimuth.

The term "clearance" is herein applied to signals conveying course line information to a craft outside the highly directive lobes.

The term "main beacon" is herein applied to the part of a course line guidance beacon which produces signals conveying course line information to a craft in the highly directive lobes.

In this known system, the secondary "masking" or clearance signals are radiated on a carrier wave which differs in frequency from the main carrier by the order of 10 kc./sec. Very near to the desired course, the primary beacon directive signal "captures" the weaker secondary radiation, and possible errors due to the secondary radiation are suppressed by a large factor. At angles of azimuth which differ from the desired course, the secondary radiation has the greater field-strength, and hence it is able to provide reliable off-course information.

In approach systems and glide-path systems in current use, the main beacon sets up complementary overlapping directive radiation with modulation frequencies of 90 and 150 c./s. The desired course is indicated by the equi-signal azimuth (or elevation), when the two radiations have the same field strength.

If, now, the clearance radiation uses the same carrier and sideband frequencies, clearance signals reflected by obstacles impose direct interference on the course-line, by adding or subtracting unequal modulations to the normally equal modulations.

Thus the clearance signals may cause spurious signals on the course line making it difficult to follow.

In the known solution to the problem, the use of different carrier frequencies causes the stronger carrier to predominate and thus capture the weaker. The chief effect of the weaker carrier is to produce an unwanted beat frequency of 10 kc./sec. The transfer of modulation is very slight, for "down" modulation of the stronger carrier by the weaker when in antiphase with it is compensated exactly by "up" modulation when in phase. Modulation "capture" is not quite complete, however, for when the two carriers are momentarily in phase quadrature, the net result is a slightly enhanced carrier level.

According to a first aspect of the invention there is provided a course line guidance beacon including means to define electromagnetically the course line by radiating signals in two directive lobes, and means to radiate a clearance signal, the phase relationships between the signals in the directive lobes and the clearance signal being such as to reduce the effect of interference between the clearance signal and the signals in the directive lobes.

According to a second aspect of the invention there is provided a course line guidance beacon including means to define the course line by spatial overlap between two highly directive radiation lobes having different amplitude modulation envelopes, and means to radiate as a clearance signal a less directive lobe, which has an amplitude modulation envelope in phase quadrature with the envelope of one of the highly directive lobes and which is positioned generally on the same side of the course line as the said one lobe.

The latter lobe may overlap the course line but should only be of appreciable intensity on the one side of it.

There may also be a second less directive carrier lobe generally on the other side of the course line with an AM envelope in phase quadrature with that on the other highly directive lobe.

This second lobe may not be necessary, for instance when the course line is a glide path, the aircraft will nearly always approach the path from underneath it, and so clearance signals will only be necessary underneath it.

An advantage of the new system is that the same carrier wave may be used for the two directive and the less directive radiations.

If two carrier waves of different frequencies are used, the use of quadrature low-frequency modulations permits "capture effect" at R.F. and L.F., the two effects being cumulative. Hence we are provided with a considerable improvement in suppression of effects of obstacle reflections.

The mechanism of capture effect at low frequency will now be explained.

Let us consider an obstacle reflected signal from a clearance area which may be irradiated predominantly with the 90 c./s. clearance sidebands. Let us assume that the reflected signal is reflected to a receiver situated on the course-line where wanted 90 c./s. and 150 c./s. components are of equal amplitude. If the reflected 90 c./s. sideband is received with ¼ of the amplitude of the wanted 90 c./s. component, then the net unbalance of tones on the course-line when using the same low frequency phases could be as much as $1 \pm 1/4 / 1$ or 25%, which represents a considerable distortion of the course.

If, however, L.F. phases are in quadrature, maximum ratio of 90 and 150 c./s. amplitudes can only rise to $\sqrt{1+(1/4)^2}=1.03$.

Thus, distortion of course-line is reduced by a factor of 8.

Embodiments of the invention and their radiation patterns will now be described with reference to the accompanying drawings, in which:

FIGS. 3A, 3B and 4C show radiation patterns of clearance signals,

Figures 5A, 5B, 7:
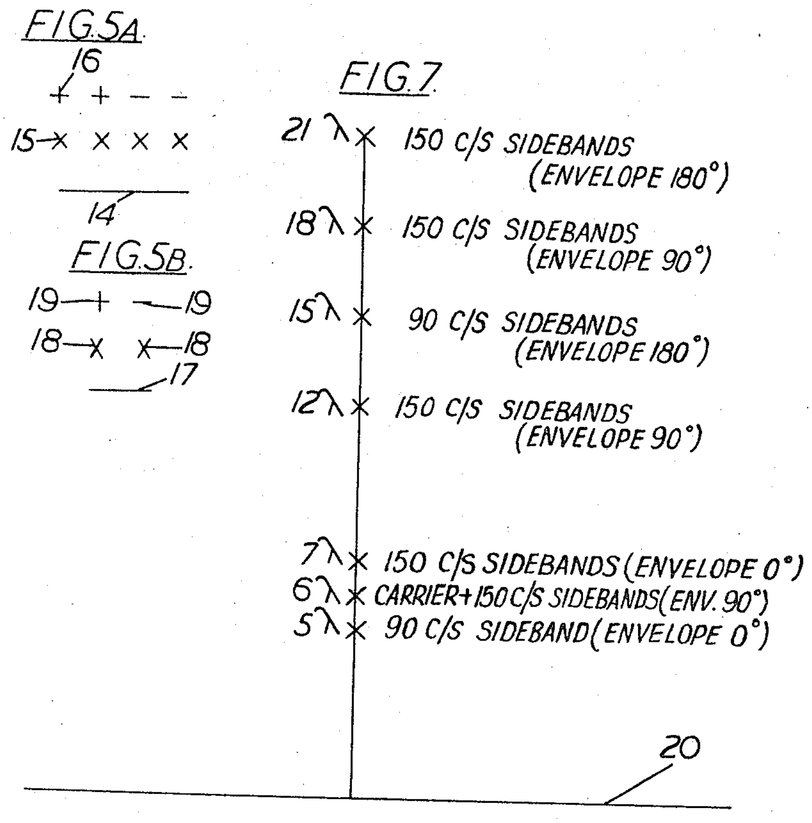
FIGS. 5A and 5B show clearance sideband signal aerial arrangements.
Figures 6A, 6B, 7A, 7B:
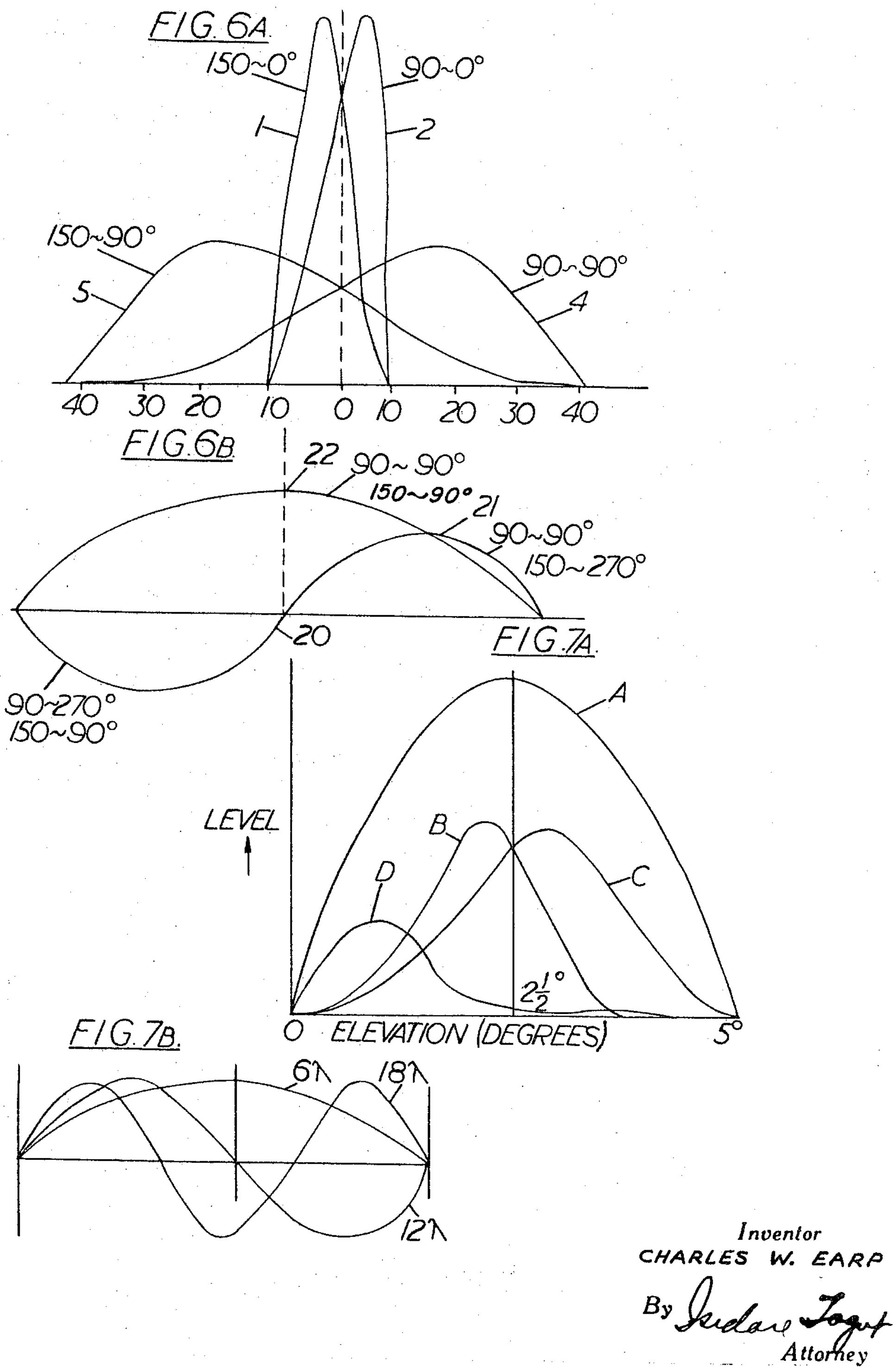
Figure 8:
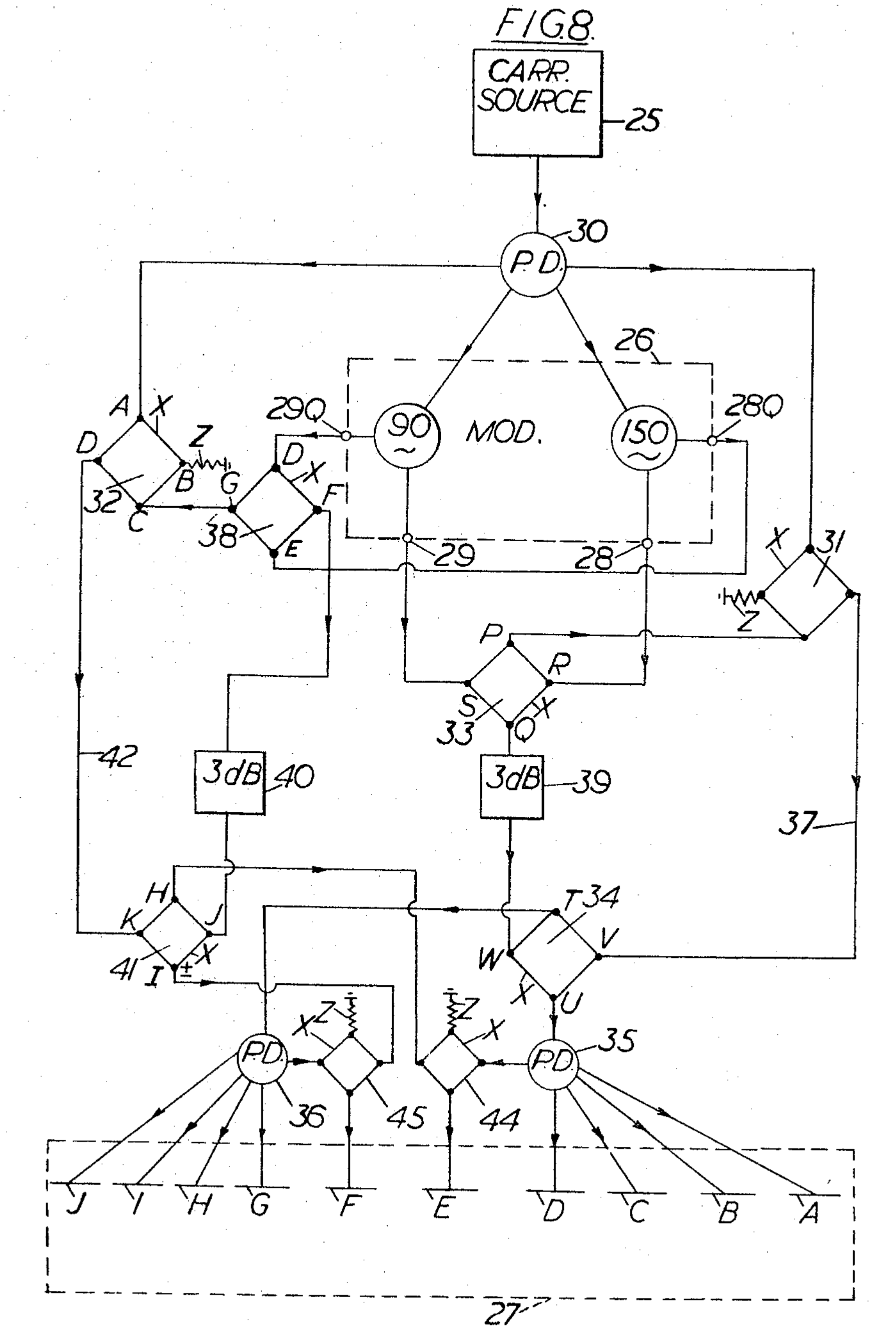

FIG. 6A shows the radiation pattern of highly directive sideband lobes and of less directive clearance sideband lobes, FIG. 6B shows the method of developing the less directive clearance sideband lobes, FIG. 7 shows an aerial arrangement for a glide path beacon, FIG. 7A shows the relative amplitudes of carrier and sideband components radiated by the arrangement of FIG. 7, and FIG. 7B shows the method of developing the clearance signal radiation from the arrangement of FIG. 7, and FIG. 8 is a schematic diagram showing signal feed arrangements in a course line guidance beacon.

Where sidebands of the same frequency are required with two different envelope phases, as in the present invention, they are conveniently generated by a mechanical balanced modulator. This modulator provides two pairs of quadrature sidebands from a single carrier source, with very high efficiency.

The carrier used for the main highly directive, sideband radiations may be of the same frequency as the carrier used for the clearance signal, and preferably is so, as in the embodiments described.

Figure 1:
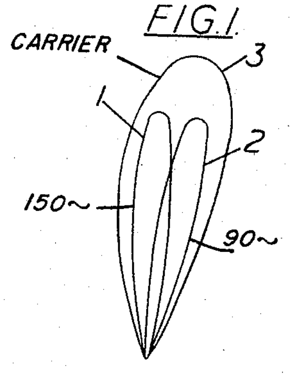
FIG. 1 shows "sideband" overlapping lobes each having modulation envelopes at one frequency only, the modulation frequencies being different, these lobes being highly directive, and an unmodulated carrier lobe.

Referring to FIG. 1 the polar diagram of the main beacon radiations from a typical approach beacon giving azimuth guidance is shown, with a lobe 1 defining a sideband radiation resulting from a 150 c./s. modulation, and a lobe 2 defining a sideband radiation resulting from a 90 c./s. modulation and completely separate from lobe 1.

The line 3 defines the relative strength of the carrier.

Figure 2:
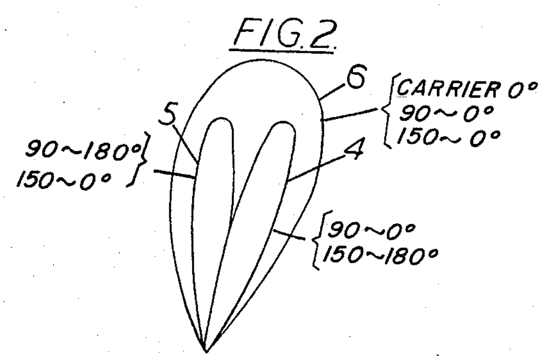
FIG. 2 shows highly directive overlapping sideband lobes each lobe modulated at both 90 c./s. and 150 c./s. in opposite phases to the other lobe, and an unmodulated carrier lobe.

The method of developing these radiations in a practical beacon is illustrated in FIG. 2, which shows a lobe 4 consisting of a 90 c./s. sideband modulation with a radio frequency phase of 0° and a 150 c./s. sideband modulation with an R.F. phase of 180°, a lobe 5 consisting of a 90 c./s. sideband modulation with an R.F. phase of 180° and 150 c./s. sideband modulation with an R.F. phase of 0°. The line 6 defines the relative strength of a combined radiation consisting of the carrier with a phase of 0° plus a 90 c./s. sideband modulation with an R.F. phase of 0° and a 150 c./s. sideband modulation with an R.F. phase of 0°. These signals are radiated from a linear broadside aerial array having a number of similar radiating elements.

The polar diagrams of the radiations from the transmitter shown in FIG. 2 are exactly equivalent to, and combine to form the polar diagrams of, FIG. 1.

Figure 3A:
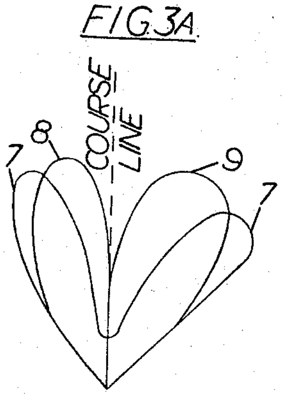

In FIG. 3A, which shows the clearance signal radiation pattern in polar co-ordinates, the line 7 represents the polar diagram of the carrier plus sideband radiation, and lines 8 and 9 represent the polar diagrams of the respective sidebands only. The phases of the envelops of the low frequency signals at 150 c./s. and 90 c./s. are arranged to be in quadrature with the phases of the low frequency signals in the equivalent lobes of FIG. 2.

Figure 3B:
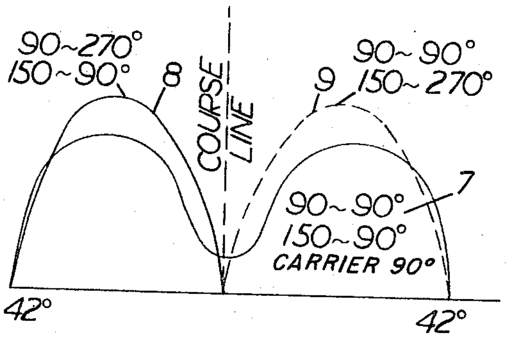
Figure 3C:
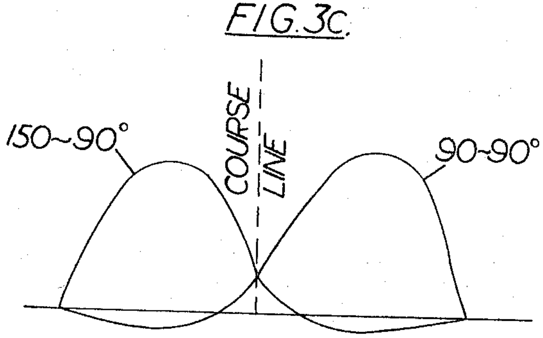

FIG. 3B shows the clearance signal radiation in rectangular coordinates. The phase of the carrier plus sideband radiation is constant, whilst the phase of the sidebands only radiation reverses on either side of the course line. FIG. 3C shows in rectangular coordinates the equivalent combined clearance radiation pattern which consists substantially of a 90 c./s. sideband modulation on one side of the course line and a 150 c./s. sideband modulation on the other side of the course line. The main beacon signals and the clearance signals must have the same centre of radiation. In this embodiment of the invention the clearance signals are radiated from certain of the main beacon radiating elements.

Figure 4A:
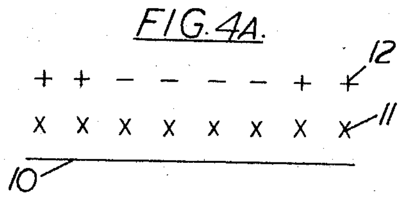
FIGS. 4A and 4B show clearance carrier and sideband signal aerial arrangements.
Figure 4B:
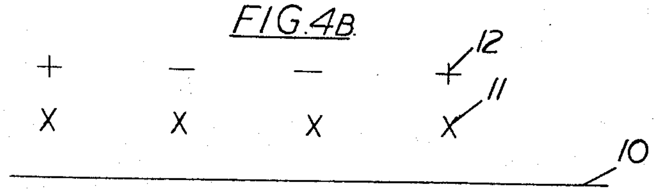

The carrier and sideband radiation is of "dumb-bell" form, and is produced by feeding a number of elements, backed by a reflecting screen, as shown in FIG. 4A, in which the reflecting screen is represented by line 10, the radiating elements are represented by $x$'s on the line 11, and the R.F. phase of the signal radiated from each of the radiating elements is indicated by the symbols on line 12. The phase of the carrier does not reverse on passing through the balance-point on the course line. The radiating elements are spaced $\frac{3}{8}\lambda$ apart and $\lambda/4$ from the reflecting screen 10.

The sideband radiation diagram, which has opposite R.F. phase in its two lobes, is produced exactly as the sideband radiation of FIG. 2, but by excitation of fewer elements on a shorter base, as shown in FIG. 5A, in which the reflecting screen is represented by line 14, the radiating elements are represented by $x$'s on the line 15 and the R.F. phase of the signal radiated from each of the radiating elements is indicated by the symbols on line 16. The phase of the sideband envelopes reverse on passing through the course line, because of the asymmetry in carrier phase of energization of the aerials. The radiating elements are spaced $\frac{3}{4}\lambda$ apart and $\lambda/4$ from the reflecting screen 14.

If wide angle coverage is required, two elements will suffice, as shown in FIG. 5B, where 17 represents the reflecting screen, 18 represents the radiating elements and the R.F. phases of the radiated signals are indicated at 19.

The phase of the carrier of the clearance signal is not vital, so long as it does not tend to cancel out the main carrier radiation. Preferably, as in this embodiment of the invention, however, the clearance carrier is in quadrature with the main carrier. Under this condition the clearance carrier does not demodulate the main sidebands—neither does the main carrier wave demodulate the clearance sidebands.

The R.F. phase of the clearance sidebands must be the same as the clearance carrier phase, so that sidebands produce pure amplitude modulation of the carrier.

In place of the carrier plus sideband radiation of dumbbell form, this signal could be radiated from the arrangement shown in 4B, as an alternative to that shown in 4A. In the arrangement shown in 4B the elements are spaced $\frac{3}{4}\lambda$ apart and $\lambda/4$ from the reflecting screen 10. FIG. 6A shows in rectangular coordinates the relative levels of the main beacon and clearance radiations when such an arrangement is used. The carrier radiation (3 in FIG. 1) is not shown. FIG. 6B shows in rectangular coordinate the clearance radiation pattern from which the resultant radiation pattern of FIG. 6A is obtained. The sideband lobes 20 and 21 of reversed phase are produced by feeding two radiating elements in phase opposition. The carrier plus sideband lobe 22 of constant phase is produced by feeding two radiating elements in parallel.

The sideband radiation may, for example, be radiated from the aerial arrangement shown in FIG. 5B, in which the elements are spaced $\frac{3}{8}\lambda$ apart and $\lambda/4$ from the reflecting screen 14.

Although the clearance signals are radiated from elements common to both the clearance and the main highly directive radiations, in this embodiment of the invention, it is permissible to use separate aerial arrangements for the clearance and main beacon radiations.

The signal feed arrangements used in a course line guidance beacon according to the invention will now be described. Referring to FIG. 8 of the drawings there is shown a carrier wave source 25, a balanced amplitude modulator indicated by the dotted line 26, and a linear broadside aerial array composed of similar radiating elements, indicated within the dotted line 27.

Sidebands of the carrier wave from the source 25 are combined with the original carrier wave in bridge networks and are fed to the aerial array, the carrier wave being modulated in the modulator 26 by signals at 90 c./s. and 150 c./s. Sidebands of the carrier wave corresponding to the modulating signal frequencies of 90 c./s. and 150 c./s. are obtained at output terminals 28 and 29 respectively, of the modulator 26. Sidebands of the carrier-wave corresponding to the said modulating signal frequencies but having modulation envelopes in quadrature with those of the signals at 28 and 29 are obtained at output terminals 28Q and 29Q of the modulator 26.

The carrier wave from the source 25 is fed to a power divider 30 having two pairs of outputs. One pair is connected to the input of the modulator 26, the other pair is connected to respective corners of two transmission line bridges 31 and 32. The sides of the bridges 31 and 32 each have an electrical length of λ/4, except where those marked X which have an electrical length of 3λ/4. Balancing impedances Z, are connected between earth and corners of the bridges to which no other external connections are made. The purpose of the bridges 31 and 32 is to combine the carrier wave with the 90 c./s. and 150 c./s. sidebands, produced in the modulator 26, without interaction between the stages.

The output terminals 28 and 29 of the modulator 26 are respectively coupled to opposite corners R and S, of a third transmision line bridge, 33, which is similar to bridges 31 and 32, the arm RQ of the bridge 33 having an electrical length of 3λ/4. Of the second pair of opposite corners of the bridge 33, P is connected to the corner of the bridge 31 opposite to its connection from the power divider 30, whilst Q is connected via a 3*db* loss pad 39 to a corner W of a further transmission line bridge 34, whose function will be described later. The 90 c./s. and 150 c./s. sidebands fed from P, to bridge 31 have the same radio frequency phases whilst the 90 c./s. and 150 c./s. sidebands fed from Q to the bridge 34 have opposite radio frequency phases.

Of the second pair of opposite corners of the bridge 31, one is connected to earth via a balancing impedance Z, whilst the other is connected via a transmission line 37 to corner V, opposite to corner W, of the bridge 34. The electrical length of the side UW of the bridge 34 is 3λ/4, the other sides are λ/4, as in the previously mentioned bridges.

The second pair of opposite corners of the bridge 34, U and T, are connected to the inputs of power dividers 35 and 36, respectively. The 90 c./s. and 150 c./s. sidebands from the bridge 33 have opposite phases at T and U, due to the phese reversal in the arm UW. The power divider 35 feeds radiating elements 27A, 27B, 27C, 27D and 27E which constitute one half of the aerial array 27. The power divider 36 feeds radiating elements 27F, 27G, 27H, 27I and 27J which constitute the other half of the aerial array 27 and are located on the opposite side of the course line. The 90 c./s. sidebands from the bridge 33 are thus fed to two halves of the aerial array in antiphase. The same conditions apply to the 150 c./s. sidebands which, moreover, are in antiphase with respect to the 90 c./s. sidebands, owing to the phase reversal in the arm RQ of the bridge 33. The distribution of the side only main signals to the aerial array 27 may be summarised in the terms of their radio frequency phase as follows:

| | |
|---|---|
| Radiating elements **27A** to **27E** | 90 c./s. 0 degrees<br>150 c./s. 180 degrees |
| Radiating elements **27F** to **27J** | 90 c./s. 180 degrees<br>150 c./s. 0 degrees |

In addition to the sideband only signals combined carrier plus sideband (CSB) signal are fed from the bridge 31 via the transmission line 37 and the bridge 34 to the power dividers 35 and 36. The electrical length of the transmission line 37 is adjusted to be such that the CSB signal is fed to all the radiating elements of the array 27 with a radio frequency phase of 0 degrees.

The clearance signal radiation will now be considered. Sidebands at 90 c./s. and 150 c./s. are obtained from terminals 28Q and 29Q of the modulator 26 having envelopes in phase quadrature with the envelopes of the sidebands at terminals 28 and 29 respectively. The clearance signal sidebands are combined in a fifth transmission line bridge 38, one pair of opposite corners D and E of the bridge, being connected to terminals 29Q and 28Q, respectively. Of the remaining pair of opposite corners of the bridge 38, one corner F is connected via a 3 db loss pad 40 to a sixth transmission line bridge 41, and the second corner G is connected to a corner of the transmission line bridge 32, opposite the corner to which the power divider 30 is connected. The arm DF of the bridge 38 has an electrical length of 3λ/4, whilst the electrical length of the remaining arms is λ/4.

The sidebands at 90 c./s. and 150 c./s. have relative phases of 0 degrees and 180 at corner F and a relative phase of 0 degrees at corner G of bridge 38. The sidebands at G are combined with the clearance carrier in the bridge 32 to form a CSB signal which is fed to a corner K of the transmission line bridge 41, opposite the corner J to which the sidebands from the corner F of the bridge 38 are fed. The remaining pair of opposite corners, H and I, of the bridge 41 are connected to one corner of further transmission line bridges 44 and 45, respectively. The arm JI of the bridge 41 has an electrical length of 3λ/4, the remaining arms of the bridge have a length of λ/4.

As in the case of the transmission line bridge 34, the sidebands at opposite corners H and I of the bridge 41 are in anti-phase to each other, and the 90 c./s. and 150 c./s. sidebands have phases of 90 and 270 degrees, respectively, at each of the corners. The transmission line bridge 44 to which the corner H of the bridge 41 is connected is similar to all the other bridges. The corner of the bridge 44 opposite the connection from the corner H of the bridge 41 is connected to one of the outputs of the power divider 35. A third corner of the bridge 44 is connected to the radiating element 27E, whilst the fourth corner is connected to earth through a balancing impedance Z. The 3λ/4 arm of the bridge 34 is positioned so that the clearance sideband signals cancel at the connection from the output of the power divider 35.

Similarly the transmission line bridge 45 has one pair of opposite corners connected to corner I of bridge 41 and one of the outputs of the power divider 36, and a second pair of opposite corners, one of which is connected to earth through a balancing impedance Z and the other is connected by the radiating element 27F. Again the 3λ/4 arm of the bridge 45, which is similar to all the other bridges, is positioned so that the clearance sideband signals cancel at the connection from the output of the power divider, 36.

The radiating elements 27E and 27F are thus fed with clearance sideband signals having opposite phases on opposite sides of the course line. The distribution of the sideband only clearance signals fed to the aerial array 27 may be summarized in terms of their relative envelope phases as follows:

| | |
|---|---|
| Radiating element **27E** | 90 c./s. 90 degrees<br>150 c./s. 270 degrees |
| Radiating element **27F** | 90 c./s. 270 degrees<br>150 c./s. 90 degrees |

In addition to the sideband only clearance signals the bridge 41 is supplied with clearance CSB signals via the transmission line 42, the electrical length of which is adjusted so that the clearance CSB signals do not tend to cancel the main beacon CSB signals.

In addition to the clearance signals the radiating elements 27E and 27F are, as previously mentioned, supplied with the main signal sideband only and CSB radiations.

The resultant mian signal radiation pattern produced by the aerial array 27 comprises two oppositely phased highly directional sideband lobes superimposed on a single carrier plus sideband lobe, similar to that shown in FIG. 2.

The clearance signal radiation will consist of two sideband lobes on opposite sides of the course line and a single broad CSB lobe symmetrical about the course line. In this embodiment of the invention the more complex dumb-bell CSB lobe described in connection with the previous embodiments of the invention is not produced. No provision is made for making the unmodulated clearance carrier wave in phase quadrature with the unmodulated main carrier wave in this embodiment of the invention.

It will be obvious to those versed in the art, that clearance signals may equally be devised for glide-path beacons. This is particularly necessary, for beacons which give accurate information on a glide-angle of 2½° must radiate very litle energy below 1° of elevation: otherwise obstacles and low hills will reflect signals and cause large errors. Hence, it is particularly desirable to arrange a clearance system, for the aircraft using the beacon will naturally approach the glide-path from "underneath," where it is necessary to radiate a considerable field-strength for the sake of range.

It is obvious that the "null-reference" type of glide-path beacon, which is exactly equivalent to the null-reference azimuth guidance system already described, the clearance radiation could be arranged in similar manner. We shall therefore describe a glide-path system of the "signal-comparison" or "equi-signal" type. Another difference on the new example is that "clearance" is provided only below the glide-path angle, clearance above the glide-path being usually unnecessary.

FIG. 7 shows the aerial system of the beacon, with antennas X arranged as a vertical stack above ground 20 providing 7 centres of radiation, at heights above ground of 5λ, 6λ, 7λ, 12λ, 15λ, 18λ, and 21λ.

FIG. 7A shows the relative amplitudes of carrier and sideband radiations with angle of elevation, in which A represents carrier, excitation at 6λ; B represents 150 c./s. sideband at 7λ, and 150 c./s. sideband at 21λ; C represents 90 c./s. side at 5λ, and 90 c./s. sideband at 15λ; D represents quadrature 150 c./s. sideband at 6λ, 12λ and 18λ.

FIG. 7B illustrates the derivation of curve D of FIG. 8 by the summation of the 6λ, 18λ and 12λ components.

Approximately equal amounts of 150 c./s. and 90 c./s. sidebands are radiated from the centres of radiation at 6λ, 12λ and 18λ. The level of the carrier A is of the order of 10 db greater than the peak level represented by the curve 9.

While I have described above the principles of my invention in connection with specific apparatus, it is to be clearly understood that this description is made only by way of example and not as a limitation to the scope of my invention as set forth in the objects thereof and in the accompanying claims.

What I claim is:

1. A course line guidance beacon including means to define the course line by spatial overlap between two highly directive radiation lobes having different amplitude modulation envelopes, and means to radiate as a clearance signal a less directive lobe, which has an amplitude modulation envelope in phase quadrature with the envelope of one of the highly directive lobes and which is positioned generally on the same side of the course line as the said one lobe.

2. A course line guidance beacon including means to radiate in a radiation pattern on both sides of the course line a carrier wave and sidebands produced by amplitude modulation of the carrier wave by first and second frequency signals, the carrier wave and the sidebands having the same constant radio frequency phase on both sides of the course line, means to radiate in two highly directive radiation patterns on opposite sides of the course line sidebands produced by amplitude modulation of the carrier wave by the first and second frequency signals, the sidebands in one of the highly directive radiation patterns produced by the amplitude modulation of the carrier wave by the first frequency signal being in radio frequency phase with the corresponding sidebands in the said carrier and sideband radiation pattern and in radio frequency antiphase with the sidebands produced by amplitude modulation of the carrier wave by the second frequency signal in the said one of the highly directive radiation patterns, the sideband in the other of the highly directive radiation patterns produced by the amplitude modulation of the carrier wave by the first frequency signal being in radio frequency antiphase with the corresponding sidebands in the said carrier and sideband radiation pattern and in radio frequency antiphase with the sidebands produced by amplitude modulation of the carrier wave by the second frequency signal in the said other of the highly directive radiation patterns, and means to radiate clearance signals amplitude modulated by further first and second frequency signals in phase quadrature with the said first and second frequency signals.

3. A course line guidance beacon as claimed in claim 3 wherein the means to radiate the clearance signal includes means to radiate in a radiation pattern on both sides of the course line the carrier and sidebands produced by amplitude modulation of the carrier wave by the said quadrature first and second frequency signals, the carrier wave and the sidebands having the same constant radio frequency phase on both sides of the course line, means to radiate in two radiation patterns, one on each side of the course line, less directive than the said highly directive radiation patterns sidebands produced by amplitude modulation of the carrier wave by the said quadrature first and second frequency signals, the sidebands in one of the less directive radiation patterns produced by the amplitude modulation of the carrier wave by the said quadrature first frequency signal being in radio frequency phase with the corresponding sidebands in the clearance carrier and sideband radiation and in radio frequency antiphase with the sidebands produced by amplitude modulation of the carrier wave by the said quadrature second frequency signal in the said one of the less directive radiation patterns, the sidebands in the other of the less directive radiation patterns produced by the amplitude modulation of the carrier wave by the said quadrature first frequency signal being in radio frequency antiphase with the corresponding sidebands in the clearance carrier and sideband radiation pattern and in radio frequency antiphase with the sidebands produced by the amplitude modulation of the carrier wave by the said quadrature second frequency signal in the said other of the less directive radiation patterns.

4. A course line guidance beacon as claimed in claim 3 wherein the clearance carrier and sideband radiation pattern is of dumb-bell form whereby the radiated clearance signals are stronger over a range of angles outside those covered by the highly directive radiations than on the course line.

5. A course line guidance beacon as claimed in claim 3 wherein the highly directional lobes and the clearance signals are radiated from an antenna array comprising a number of antenna elements arranged on a line and backed by a reflecting screen.

6. A course line guidance beacon as claimed in claim 2 wherein the highly directional radiation patterns and the clearance signals are radiated from an antenna array comprising a number of antenna elements stacked above the ground, the highly directional radiation patterns being arranged to define a course line at an angle to the ground, and the clearance signals are radiated over a range of angles below the angle of elevation of the course line.

7. A course line guidance beacon including means to define electromagnetically the course line by radiating signals in two directive lobes, and means to radiate a clearance signal having the same frequencies as the signals in the directive lobes and a different predetermined phase than the signals in the directive lobes, thereby reducing the effect of interference between the clearance signal and the signals in the directive lobes.

8. A course line guidance beacon as claimed in claim 7 wherein the clearance carrier wave and the main beacon carrier wave are in phase quadrature.

9. Method of obtaining course line guidance for a mobile object which includes amplitude modulating a carrier wave with signals at two frequencies, radiating sidebands of the carrier wave having oppositely phased modulation envelopes in respective ones of two highly directive radiation patterns on opposite sides of the course line, and radiating as a clearance signal the carrier wave amplitude modulated by two signals in phase quadrature with the said signals at the two frequencies.

References Cited by the Examiner

UNITED STATES PATENTS

| | | | |
|---|---|---|---|
| 2,279,031 | 4/1942 | Cockerell et al. | 343—107 |
| 2,283,677 | 5/1942 | Kandoian | 343—109 |
| 2,379,442 | 7/1945 | Kandoian | 343—108 |
| 2,402,378 | 6/1946 | Davies | 343—107 |
| 2,406,734 | 9/1946 | Alford | 343—108 |

CHESTER L. JUSTUS, *Primary Examiner.*

H. C. WAMSLEY, *Assistant Examiner.*